Patented Mar. 24, 1925.

1,530,670

UNITED STATES PATENT OFFICE.

RICHARD HERZ, OF FRANKFORT-ON-THE-MAIN, GERMANY, ASSIGNOR TO LEOPOLD CASSELLA & CO., GESELLSCHAFT MIT BESCHRÄNKTER HAFTUNG, A CORPORATION OF GERMANY.

VAT DYESTUFFS AND PROCESS OF MAKING THE SAME BY CONDENSING THIO-DERIVATIVES OF BENZOQUINONES WITH ARYLAMINES.

No Drawing.      Application filed August 30, 1921. Serial No. 496,968.

(GRANTED UNDER THE PROVISIONS OF THE ACT OF MARCH 3, 1921, 41 STAT. L., 1313.)

*To all whom it may concern:*

Be it known that I, RICHARD HERZ, a citizen of the German Republic, residing at Frankfort-on-the-Main, Germany, have invented certain new and useful Improvements in Vat Dyestuffs and Processes of Making the Same by Condensing Thioderivatives of Benzoquinones with Arylamines (for which I have filed applications in Germany March 24, 1919, and March 26, 1919, and in Great Britain July 8, 1920), of which the following is a full description.

I have found that the thioderivatives of the p. quinones of the benzene-series described in the German Patent 175,070 (British Patent 15,763 of 1905) can be condensed with arylamines and that the products of condensation thus produced have the valuable property of dyeing in the hydrosulfite vat especially animal fibres shades fast to washing, milling, potting and light. Of the substances described in the above named German patent the following are especially suited for the production of the new dyestuffs: the quinone-mono-and dithiosulfonic acids, the quinone mercaptanes, the diquinone-mono- and disulfides and the halogen derivatives of these compounds. Mostly yellow to yellowish brown coloring matters are produced if the reaction is carried out in an indifferent diluting or solution agent as for instance water, alcohol, acetone, etc., but if the condensation is performed at elevated temperatures and in a solution or diluting agent of an acid character as for instance glacial or aqueous acetic acid, or formic acid then dyestuffs dyeing fuller shades are obtained. It has further been found that the yellow to yellowish brown dyeing dyestuffs (produced in an indifferent diluting or solution agent) can be converted into fuller dyeing coloring matters by a suitable aftertreatment with acids or by reducing agents in an acid solution.

The following examples illustrate the nature of my invention and in what manner it is to be performed.

*Example 1.*—23.3 kilos of the potassium salt of benzoquinone-mono-thiosulfonic acid described in the German Patent 175,070 and 7.6 kilos of p. chloraniline are introduced into about 200 litres of spirit and the mixture is heated with a reflux condenser for about 4 to 6 hours, while stirring well. After cooling down the precipitated dyestuff is filtered off and washed well with dilute salt solution. The paste thus obtained can directly be used for dyeing purpose. In a dry state the coloring matter is an amorphous powder of a light brown shade. It is almost insoluble in water and dissolves more readily in diluted alkalies with a yellowish brown color in concentrated sulphuric acid it dissolves with a deep violet color. In an alkaline hydrosulfite solution an almost colorless vat is formed from which wool is dyed in fast yellowish shades. Coloring matters of a very similar character are produced if in this example the p. chloraniline is replaced by the equivalent quantity of aniline, o. m. or p. toluidine or a homologue or substitution product of these bases, or instead of the benzoquinone-mono-thiosulfonic acid the alkyl- and halogen derivatives thereof are used. Also the benzo-quinone α and β dithiosulfonic acids and their halogen derivatives yield if condensed with arylamines similar yellow to brown dyeing coloring matters.

*Example 2.*—7.2 kilos of the dibenzoquinone monosulfide and 2.5 kilos of parachloraniline are mixed with about 100 kilos of alcohol and heated with the reflux condenser for some hours. After cooling down the product of condensation which is separated is filtered off and washed with alcohol. If dried the dyestuff is a brown powder insoluble in water and alkalies. It dissolves in concentrated sulfuric acid with a violet color and forms with alkaline hydrosulfite solution an almost colorless vat, from which animal fibres especially are dyed fast yellowish brown shades. If in this example in place of the dibenzoquinone monosulfide the corresponding amount of dibenzoquinonedisulfide is used a coloring matter results dyeing wool from the vat greenish yellow shades fast to milling, potting and light.

*Example 3.*—Condensation of benzoquinone thiosulfonic acid with paraphenetidine in glacial acetic acid.

15.6 kilos of the potassium salt of benzoquinone monothiosulfonic acid and 5.6 kilos of paraphenetidine are mixed with about 150 kilos of glacial acetic acid and the mass is heated for several hours at 60 to 100° C. whilst stirring. After cooling down the separated dyestuff is filtered off, washed with water and dried if necessary. In a dry state the coloring matter is a brown powder dissolving in concentrated sulfuric acid with a blue color. Alkaline hydrosulfite solution dissolves the dyestuff to a colorless vat from which wool is dyed in deep red brown shades of excellent fastness to washing, milling, potting and light.

In these examples mostly three molecules of quinone to two molecules of arylamine are used. I do not limit myself to these proportions as they can be varied without affecting the result considerably. But if instead of the proportions given equal molecules of quinone and arylamine, or one molecule of quinone to two molecules of arylamine are used it is preferable for obtaining a good yield to add an oxygen-carrier for instance a suitable salt of cerium and to blow a strong current of air through the mass during the whole time of the reaction.

*Example 4.*—10 kilos of dyestuff obtained according to example 1 (by condensation of the potassium salt of benzoquinone-monothiosulfonic acid and parachloraniline in hot alcohol solution) are dissolved at ordinary temperature in about 10 times their weight of concentrated sulfuric acid (66° Bé). The mass is stirred for several hours then poured out on ice, filtered and washed with water until it is neutral. The paste thus produced may directly be used for dyeing purposes. Whereas the original coloring matter dyes wool yellow shades the new product produces on animal fibres intensely orange brown shades of very good fastness and dyeing properties.

*Example 5.*—24 kilos of the dyestuff produced as described in example 1 of this application are introduced into about 400 litres of water and 100 kilos of concentrated hydrochloric acid. To this while cooling well and stirring from time to time about 20 to 30 kilos of zinc dust are gradually added. The mass is then allowed to stand for some time, when a sample-dyeing shows that a further deepening of the shade does not take place, the coloring matter is filtered off and washed with water until it shows a neutral reaction. The paste so obtained is ready for dyeing purposes, if dried the dyestuff is a brown powder soluble in concentrated sulfuric acid with a deep violet color. From the hydrosulfite vat wool is dyed in fast yellow brown shades.

Having now particularly described and set forth the matter of my said invention and in what manner the same is to be performed, I declare that what I claim is:

1. The manufacture of vat dyestuffs containing sulfur for dyeing animal fibres, which consists in condensing primary arylamines with a quinone of the benzene series, in which at least one atom of hydrogen is replaced by the group $Sx$ (where $x$ means a monovalent radical) and treating the products thus obtained with acids in presence of a reducing agent, substantially as described.

2. The manufacture of vat dyestuffs containing sulfur for dyeing animal fibres, which consists in condensing primary arylamines with a quinone of the benzene series, in which at least one atom of hydrogen is replaced by the group $Sx$ (where $x$ means a monovalent radical) and treating the product thus obtained with acids, substantially as described.

3. The manufacture of vat dyestuffs containing sulfur for dyeing animal fibres, which consists in condensing primary arylamines with a quinone of the benzene series, in which at least one atom of hydrogen is replaced by the group $Sx$ (where $x$ means a monovalent radical).

4. As new articles of manufacture the herein before described new vat dyestuffs containing in their molecule the residue of the benzoquinone-nucleus and a sulfur containing group, produced by condensing a primary arylamine with a quinone of the benzene series in which at least one atom of hydrogen is replaced by the group $Sx$ (where $x$ means a monovalent radical), said dyestuffs being in a dry state yellow to brown powders, soluble with a violet to a blue color in concentrated sulfuric acid forming with an alkaline hydrosulfite solution an almost colorless vat and dyeing animal fibres from such vat yellow, to orange, to brown, to blackish shades which are distinguished by their excellent fastness to washing, fulling, milling, potting and light, all substantially as described herein.

In witness whereof I have hereunto signed my name this tenth day of August 1921, in the presence of two subscribing witnesses.

RICHARD HERZ, Ph. D.

Witnesses:
GUSTAV MÜLLER,
JACOB SCHWERJHOFF.